(12) United States Patent
Richman et al.

(10) Patent No.: US 7,267,051 B2
(45) Date of Patent: Sep. 11, 2007

(54) COTTON RECEIVING AND DENSIFICATION APPARATUS FOR A COTTON MODULE BUILDER OF A COTTON HARVESTING MACHINE

(75) Inventors: Kevin S. Richman, Lititz, PA (US); Gary R. Gallens, Geneseo, IL (US); Tracy R. Archer, West Liberty, IA (US); Michael J. Covington, Germantown, TN (US)

(73) Assignee: CNH America LLC, New Holland, PA (US)

( * ) Notice: Subject to any disclaimer, the term of this patent is extended or adjusted under 35 U.S.C. 154(b) by 195 days.

(21) Appl. No.: 11/096,751

(22) Filed: Apr. 1, 2005

(65) Prior Publication Data

US 2006/0219103 A1    Oct. 5, 2006

(51) Int. Cl.
*B30B 9/30* (2006.01)
*B30B 15/30* (2006.01)
*A01D 46/08* (2006.01)

(52) U.S. Cl. .................. 100/215; 100/146; 100/226; 56/16.6; 56/28

(58) Field of Classification Search ........ 100/100, 100/179, 188 R, 214, 215, 245, 295, 145, 100/146, 226; 56/16.6, 28, 344, 345, 346; 460/119; 193/3
See application file for complete search history.

(56) References Cited

U.S. PATENT DOCUMENTS

| 790,151 | A |  | 5/1905 | Orr |
| 831,265 | A |  | 9/1906 | Corcoran |
| 1,032,489 | A |  | 7/1912 | McCann |
| 1,702,519 | A |  | 2/1929 | Newdick |
| 1,975,295 | A |  | 10/1934 | Seeligson ............... 100/19 |
| 2,619,272 | A |  | 11/1952 | Boehling ............... 226/71 |
| 3,186,360 | A |  | 6/1965 | Forth et al. ............ 107/41 |
| 3,796,147 | A |  | 3/1974 | Richardson ........... 100/39 |
| 3,813,861 | A | * | 6/1974 | Wood ................... 56/344 |
| 3,842,730 | A | * | 10/1974 | White et al. .......... 100/245 |
| 3,886,719 | A | * | 6/1975 | Garrison et al. ....... 56/344 |
| 4,635,544 | A |  | 1/1987 | Taylor ................ 100/98 R |
| 4,727,804 | A | * | 3/1988 | Tondo et al. .......... 100/215 |
| 6,536,197 | B1 | * | 3/2003 | Covington et al. ..... 56/28 |

* cited by examiner

*Primary Examiner*—Jimmy Nguyen
(74) *Attorney, Agent, or Firm*—Michael G. Harms; John William Stader

(57) ABSTRACT

A cotton receiving and densification apparatus for an upper region of a cotton module builder adapted for receiving a plurality of side-by-side flows of cotton and air and converging and densifying the cotton for distribution and conveyance downwardly into the module builder, including a cotton receiving chamber which tapers into a cotton densification chamber, both chambers being located above and downwardly opening into an upper region of a cotton compacting chamber of the module builder, the apparatus being capable of remaining intact when the module builder is collapsed for transport and storage.

11 Claims, 4 Drawing Sheets

COTTON RECEIVING AND DENSIFICATION APPARATUS FOR A COTTON MODULE BUILDER OF A COTTON HARVESTING MACHINE

TECHNICAL FIELD

This invention relates generally to a cotton module builder or packager of a cotton harvesting machine, and more particularly, to cotton receiving and densification apparatus for a module builder adapted for receiving a plurality of side-by-side flows of cotton and air and converging and densifying the cotton for distribution and conveyance downwardly into the module builder or packager.

BACKGROUND ART

Presently, when harvesting cotton, in many instances, it is desirable to harvest as many rows of cotton plants as possible during a pass of a harvesting machine through a field of cotton plants. It is now common for as many as 6 rows of plants to be simultaneously picked from both sides. Typically, a cotton harvesting machine includes a plurality of side-by-side ducts extending from the picker units of the harvesting apparatus to an inlet opening of a cotton receiver. Some cotton receivers are baskets and may, or may not, include apparatus for compacting cotton received therein to some extent. Typically, such baskets have an overall width which is about equal to the maximum allowed width of a vehicle for unescorted travel over public roads, which is about 12 feet in the USA. The ducts extending in side-by-side relation from the picker units are typically positioned to propel flows of cotton and air through an elongate inlet opening extending across all or much of the sideward extent of the upper front end of the basket. Thus, the overall sideward extent of the plurality of side-by-side ducts at their interface with the cotton receiving basket can be about equal to, or only marginally smaller than, the sideward extent of the upper region of the basket itself, for side-by-side flows of cotton into the basket. The flows of air from the ducts are typically strong enough to carry at least some of the cotton through the upper region of the basket into a rear region of the interior thereof. The basket can include cotton compacting and distributing apparatus therein, such as a frame carrying one or more augers rotatable in one or both rotational directions for distributing the cotton within a lower region of the basket, to the extent desired or required. Typically, when a cotton basket is filled to its capacity with cotton, the cotton is unloaded into another basket or other device for transport to a storage location or a gin. A common disadvantage of cotton baskets is that the cotton is not densely compacted, such that, when unloaded, it is not in a unitary, free standing state, and therefore, requires further handling which is not as efficient both costwise and timewise.

More recently, cotton harvesting machines have been equipped with cotton receivers known as cotton module builders, and also cotton packagers, which receive the cotton from the plurality of side-by-side ducts, and include compacting and distributing apparatus operable for compacting the cotton in a cotton compacting chamber of the module builder or packager into a cohesive, unitary body or module of compacted cotton. Herein, the terms module builder and packager are to be interpreted interchangeably. The cotton distributing and compacting apparatus typically includes at least one auger rotatable for conveying cotton through the compactor and distributing the cotton in a desired manner or pattern within the module building chamber. Such a cotton module can be unloaded from the module builder onto the ground or another surface in a free standing, unitary state, for storage and eventual transport to a gin for processing. Typically, such cotton modules have dimensions including a length of about 16 feet, and a width at the bottom and height of between about 7 and 9 feet. A completed cotton module can have a weight of up to about 11,000 pounds. It has been found to be desirable for the upper region of a cotton compacting chamber to have a sideward extent which is substantially less than that of a completed module, such that the upper portion of a module compacted in the chamber will have a corresponding smaller sideward extent. Then, when the module is removed from the chamber, due to springiness of the compacted cotton, the upper region of the module typically expands sidewardly, such that the module will have a more rectangular shape.

As a result, it has been found to be desirable for the cotton compacting chamber of a cotton module builder to have opposing side walls which taper convergingly from a floor in the chamber to an upper region of the chamber into which the cotton is received from the side-by-side plurality of ducts. The sideward extent or width of the cotton compacting chamber at the upper end can possibly be as small as from about 3 to about 6 feet for forming a module having a base width of about 7 to 9 feet. It is desirable to have as large as possible width available for the side-by-side array of ducts delivering cotton to the upper region of the cotton module builder, for instance, up to the maximum width of a machine for travel over public roads receiving basket, or about 12 feet, such that disassembly, folding or the like, of the ducts is not required for travel over public roads. As a result, a disparity can exist between the sideward extent of the incoming flows of air and cotton, which will be equal to the sideward extent of the array of ducts, and the possible sideward extent of the upper region of the cotton receiving chamber through which the cotton is to pass enroute to the chamber.

Still further, it is desirable for cotton harvesters including module builders to have a height or upward extent in an operational mode which is significantly greater than that which is allowed for travel over public roads, but not so great so as to pose a danger of tipping. Therefore, a cotton module builder typically must be vertically collapsible from an operational height to a storage or travel height. Presently, known cotton module builders include an upper module builder structure which is telescopically movable upwardly and downwardly relative to a lower module builder structure, for configuring in an operational mode, and in a travel or storage mode. When placing the module builder in the travel or storage mode, it is desirable that any cotton receiving and densification structure not require time consuming assembly, disassembly, folding or unfolding.

Thus, what is sought is cotton receiving and densification apparatus for a cotton module builder, which provides the advantages and overcomes one or more of the problems and shortcomings set forth above.

SUMMARY OF THE INVENTION

What is disclosed is cotton receiving and densification apparatus for a cotton module builder of a cotton harvesting machine which provides at least one of the advantages and overcomes at least one or more of the problems and shortcomings set forth above.

According to a preferred aspect of the present invention, a cotton module builder for a cotton harvesting machine includes a floor and opposing side walls extending upwardly from opposite peripheral edges of the floor defining an upwardly open compacting chamber. The compacting chamber includes an upper region having a predetermined first sideward extent. The module builder includes cotton distributing and compacting apparatus supported in the upper region of the compacting chamber for movement downwardly against cotton collected therein for compacting the collected cotton into a compacted cotton module. The cotton distributing and compacting apparatus is configured for supporting cotton thereon and includes at least one elongate auger rotatable for moving cotton supported thereon longitudinally therealong and downwardly therethrough for distribution of the cotton in the compacting chamber. The preferred cotton receiving and densification structure is disposed in covering relation to the upper region of the cotton compacting chamber and above the cotton distributing and compacting apparatus. The preferred cotton receiving and densification structure defines a cotton receiving chamber generally above and downwardly open to one end of the upper region of the cotton compacting chamber and possibly a middle region thereof. The structure preferably additionally includes a cotton densification chamber in connection with the cotton receiving chamber located generally above and downwardly open to an opposite end and a middle region of the cotton compacting chamber between the one end and the opposite end. The structure further preferably defines an inwardly facing inlet opening in connection with an inlet end of the cotton receiving chamber and disposed for receiving flows of airborne cotton from a side-by-side array of ducts in connection with harvesting apparatus of a harvesting machine, the inlet opening and the inlet end of the cotton receiving chamber having a predetermined second sideward extent which is at least about twice the first sideward extent of the upper region of the compacting chamber. The structure further preferably includes side wall portions defining sides of the cotton receiving chamber which taper convergingly from the inlet region to the densification chamber such that at least portions of flows of airborne cotton received through the inlet opening into the inlet region will be convergingly guided by the side wall portions into the densification chamber.

In operation, as a result of the tapered walls and convergence of the airborne cotton flows within the cotton receiving and densification structure, portions of the airborne cotton flowing through the cotton receiving chamber will be deflected by the walls and forced by other flows of cotton, downwardly from the receiving chamber onto the cotton distributing and compacting apparatus therebeneath. Other portions of the airborne cotton flows will be convergingly directed into the cotton densification chamber wherein the cotton will fall onto the cotton distributing and compacting apparatus. The tapered transition from the receiving chamber to the densification chamber thus serves to more evenly distribute the incoming cotton. Additionally, at the same time, the at least one auger of the cotton distributing and compacting apparatus can be operated for moving cotton thereon and thereabove, longitudinally toward the cotton receiving chamber, or toward the densification chamber, as required or desired for achieving a desired distribution of the cotton into the compacting chamber therebelow. The cotton distributing and compacting apparatus will also be driven downwardly against cotton collected in the compacting chamber as desired or required for compacting the cotton into a unitary compacted body or module.

According to another preferred aspect of the invention, the cotton receiving and densification chambers have sufficient vertical extent, such that cotton can collect on the cotton distributing and compacting apparatus and be distributed by operation of the auger in a desired manner, during continuous flow of cotton into and through the cotton receiving and densification chambers thereabove.

Additionally, side portions of the cotton receiving and densification structure defining at least the cotton receiving chamber will extend sidewardly beyond the side walls of the module builder for accommodating the overall width of the side-by-side array of ducts, and the upper portion of the module builder is telescopically retractable vertically relative to the lower portion thereof with the sidewardly extending portions of the cotton receiving and densification structure fixed in position, such that no folding, unfolding, or over-disassembly of the cotton receiving and densification structure is required to prepare the module builder for transportation or storage in a vertically retracted or collapsed mode.

DETAILED DESCRIPTION OF THE INVENTION

Figure 1:
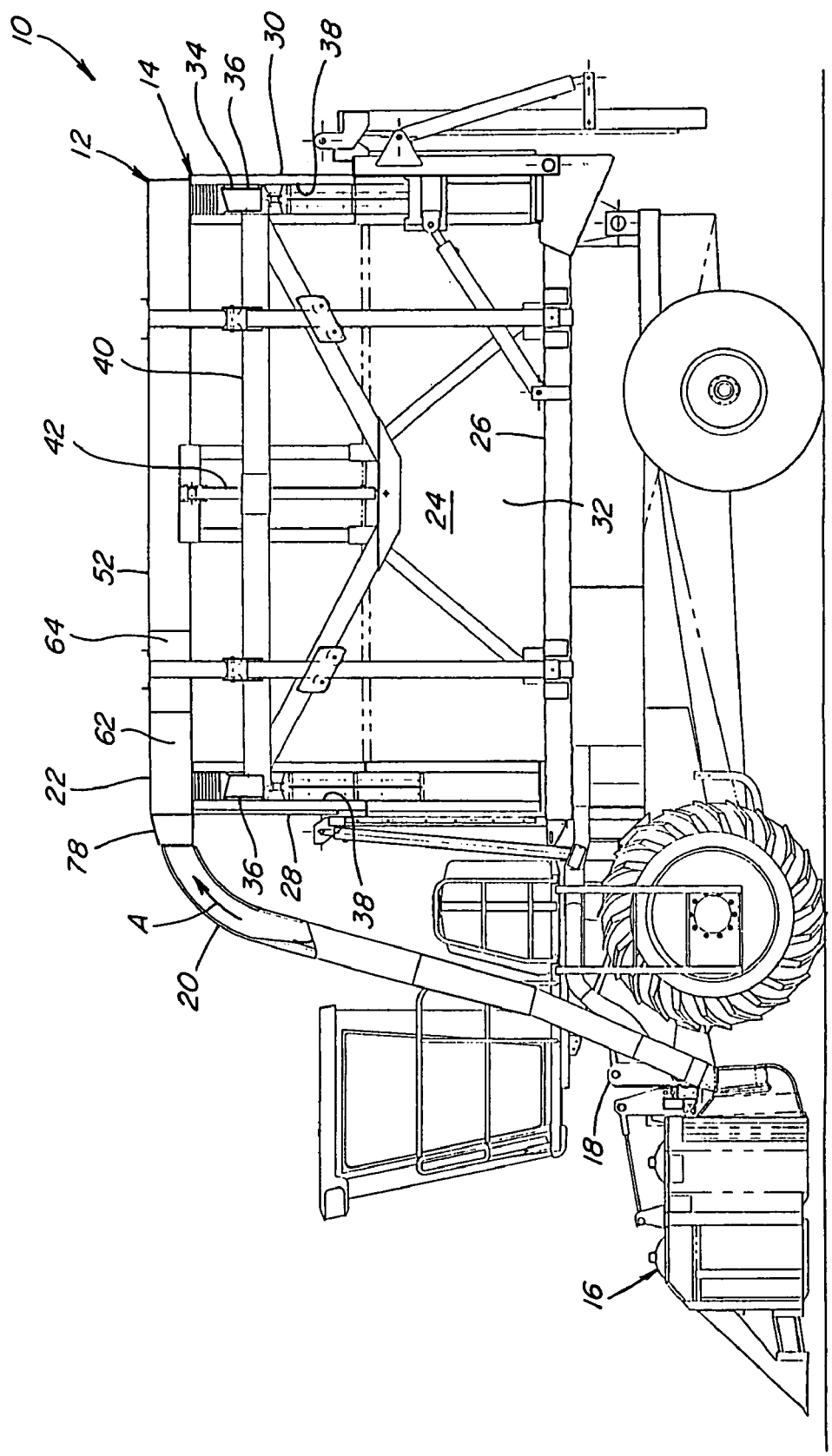
FIG. 1 is a side view of a cotton harvesting machine including a cotton module builder including cotton receiving and densification apparatus according to the invention.
Figure 5:
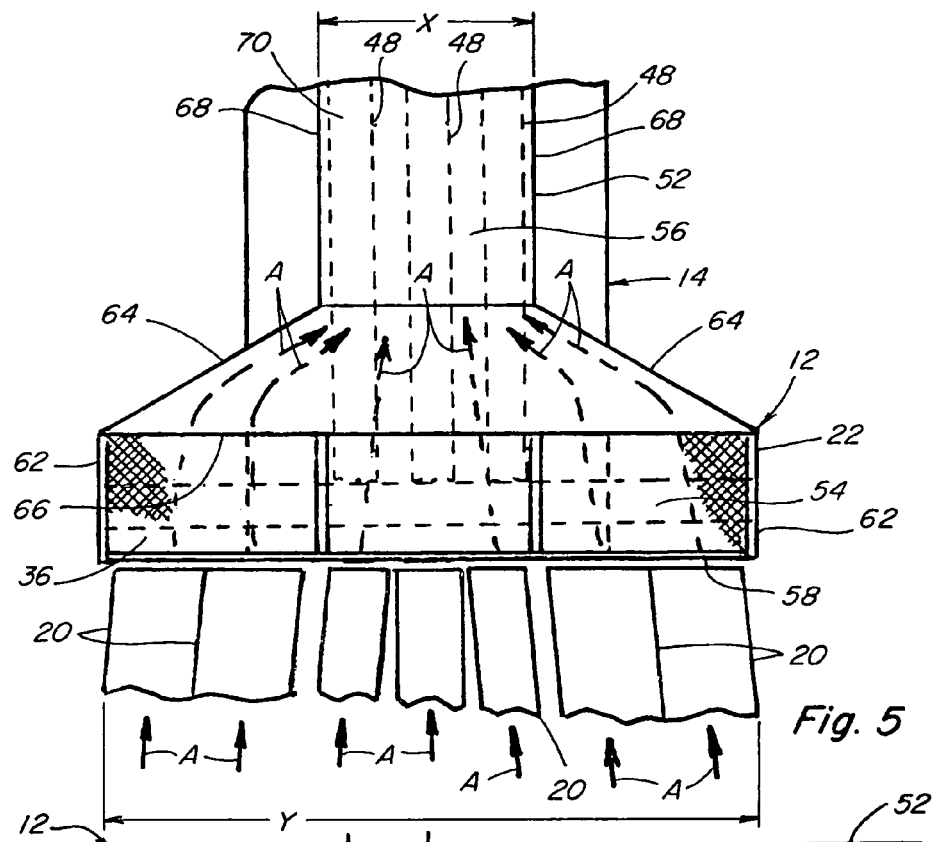
FIG. 5 is a simplified top view of the module builder and the receiving and densification apparatus, in association with an array of ducts conveying the air and cotton flows into the receiving and densification apparatus.

Referring now to the drawings, in FIG. 1 a cotton harvesting machine 10 is shown, including cotton receiving and densification apparatus 12 constructed and operable according to the teachings of the present invention on a cotton module builder 14 of the machine. Harvesting machine 10 includes a plurality of harvesting units 16 arranged in a side-by-side array across a forward end 18 of machine 10 for harvesting cotton from plants as machine 10 is moved in the forward direction along rows of the plants (not shown). The harvested cotton is conveyed by air flows individually through a side-by-side array of ducts 20 extending upwardly and rearwardly from units 16 into a forward end 22 of cotton receiving and densification apparatus 12, as denoted by arrows A (FIGS. 1, 3 and 5).

Figure 2:
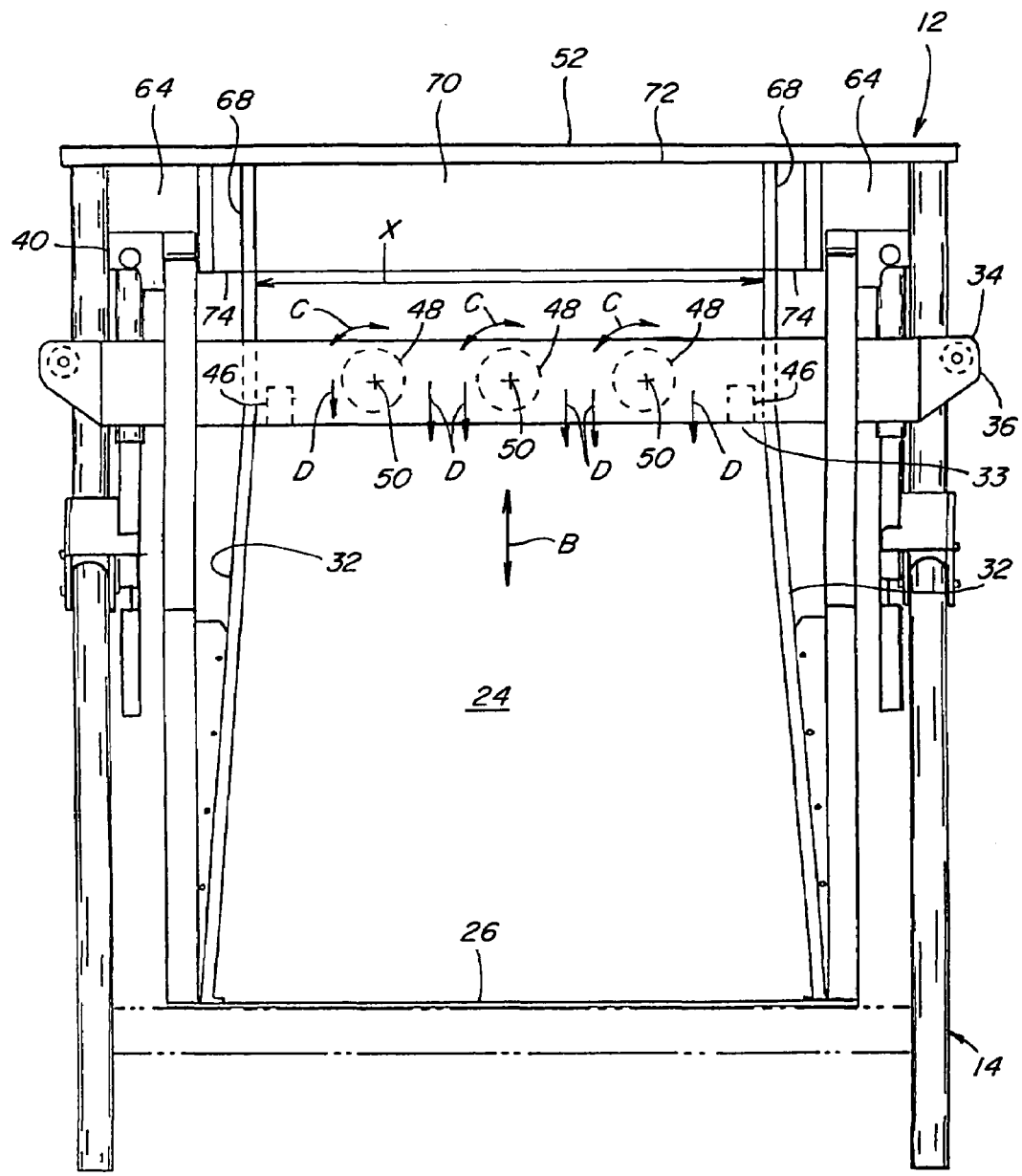
FIG. 2 is a simplified rear view of the cotton module builder of the machine of FIG. 1 with an unloader door thereof removed to show interior features of the module builder.
Figure 3:
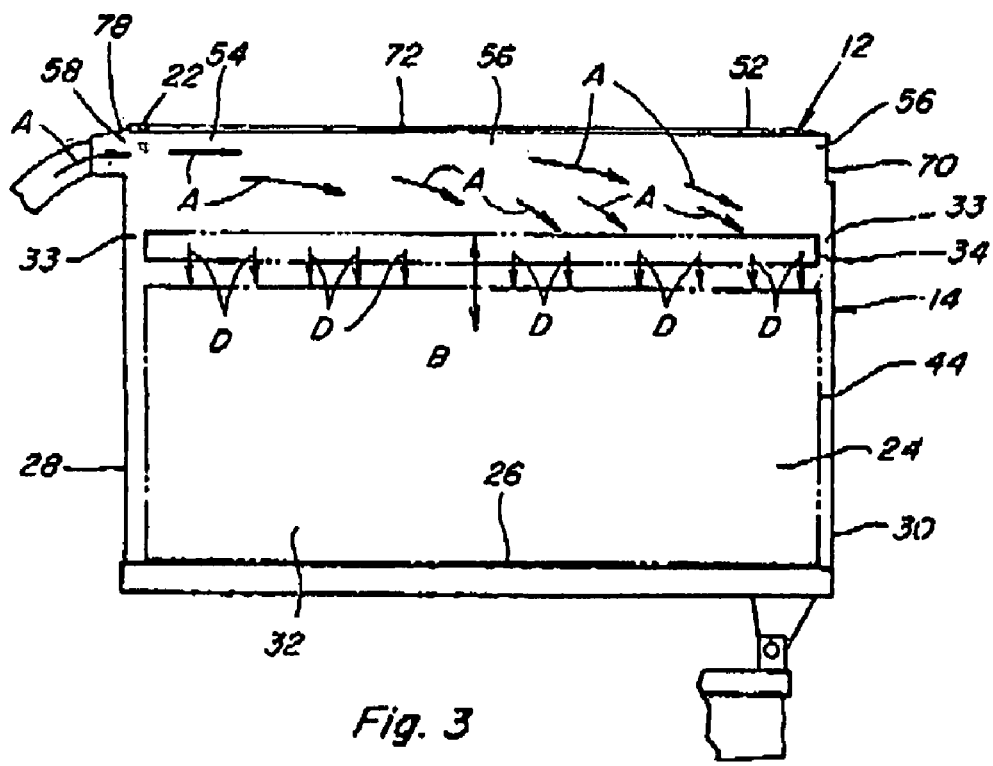
FIG. 3 is a simplified side view of the cotton module builder, showing a location of cotton distributing and compacting apparatus therein and illustrating flows of air and cotton into the receiving and densification apparatus.
Figure 4:
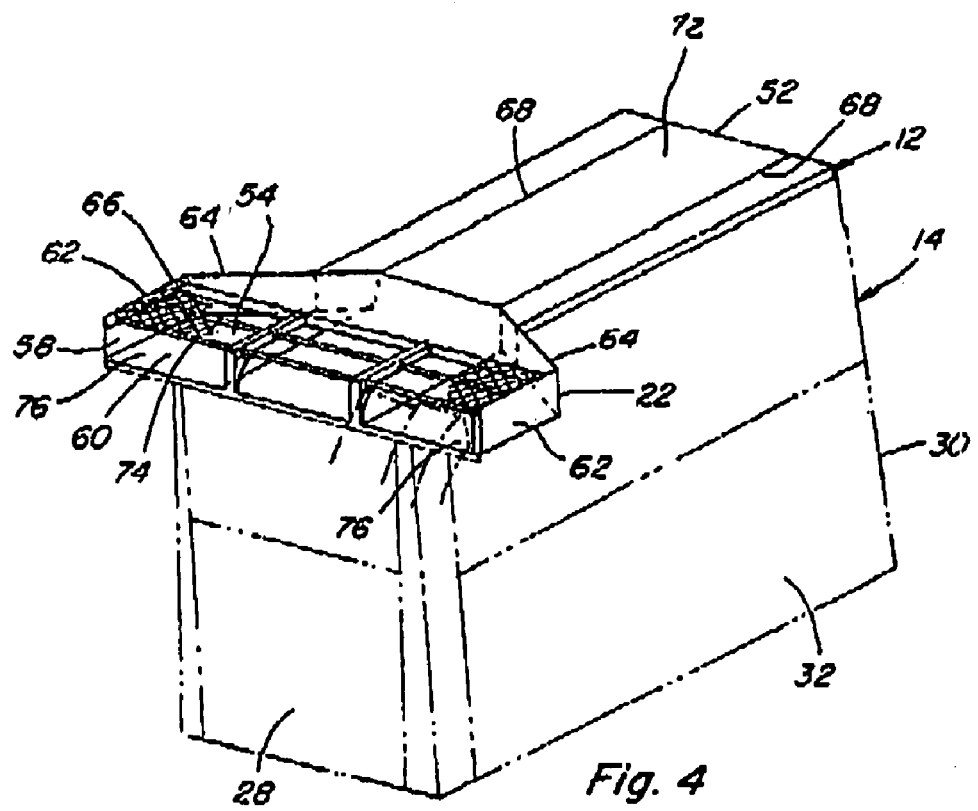
FIG. 4 is a simplified perspective view of the module builder and the receiving and densification apparatus.

Referring also to FIGS. 2, 3 and 4, cotton module builder 14 is shown. Module builder 14 is a structure of rectangular shape, including an interior cotton compacting chamber 24 defined by a floor 26, forward and rearward end walls 28 and 30, and opposing side walls 32. End walls 28 and 30, and the side walls 32, extend upwardly from floor 26 to an upper region 33 of chamber 24 which defines a generally upwardly facing opening, which is covered by and enclosed by cotton receiving and densification apparatus 12 which extends upwardly therefrom. At least end walls 28 and 30, and side walls 32, are preferably constructed of an air permeable material, such as a mesh or perforated sheeting having holes or openings therein adequate for dissipation of air flow therethrough, but which will retain the cotton therein.

Cotton distributing and compacting apparatus 34 is shown in upper region 33 of interior compacting chamber 24. Apparatus 34 includes side-to-side extending cross bars 36 adjacent to end walls 28 and 30 which extend through vertical slots 38 through the side walls 32, and are supported by a support structure 40, including a pair of fluid cylinders 42 located beside the side walls, for moving apparatus 34 reciprocally upwardly and downwardly within chamber 24, as denoted by arrows B in FIGS. 2 and 3. Essentially, in operation, as cotton, denoted by arrows D in FIG. 2, is conveyed into compacting chamber 24 by rotation of at least one augers 48, at times, apparatus 34 will be operated to move reciprocally in the downward direction denoted by arrow B, against the collected cotton to compact the cotton against floor 26 to gradually build a compacted body or module as represented by module 44 in FIG. 3. Apparatus 34 includes forwardly and rearwardly extending compacting members 46 extending between and supported by cross bars 36 in compacting chamber 24. Additionally, apparatus 34 includes at least one, and preferably a plurality of the elongate helical augers 48 extending forwardly and rearwardly between and supported by cross bars 36 at spaced locations between compacting members 46. Each auger 48 is connected in rotatably driven relation to a suitable drive (not shown) operable in the well known conventional manner for rotating the auger 48 in a desired direction, as denoted by arrows C, about a longitudinal rotational axis 50 extending therethrough. Compacting members 46 and augers 48 are preferably constructed and are sidewardly sufficiently close together, and apparatus 34 extends sidewardly across substantially the sideward extent of upper region 33 of compacting chamber 24, so as to retain or hold at least some of any cotton conveyed into apparatus 12 therein and above compacting chamber 24, when apparatus 34 is in the position shown and augers 48 are not rotated. When augers 48 are rotated, depending on the direction of rotation, they will convey cotton disposed thereon and thereabove either forwardly or rearwardly therealong, and simultaneously downwardly into compacting chamber 24, as denoted by arrows D in FIGS. 2 and 3. Here, it should be noted that it is usually desirable for a cotton module, such as module 44, to be compacted so as to have a substantially uniform height in the forward and rearward directions, and, as result, it is desirable to operate augers 48 in a manner for achieving a relatively uniform distribution of cotton within compacting chamber 24 in the forward and rearward directions. It should also be noted that upper region 33 of a compacting chamber such as chamber 24 will typically have a sideward extend, here denoted as extent X in FIG. 2, which will preferably be within a range from about 3 to about 6 feet, which will be smaller than the sideward extent of chamber 24 adjacent to floor 26, such that side walls 32 taper convergingly upwardly toward upper region 33, for imparting initial tapered shapes to the sides of a module such as module 44. As noted above, the tapered shape of the sides of a module will eventually be lost after the module is removed from chamber 24.

Cotton receiving and densification apparatus 12 preferably includes structure 52 disposed above and in covering relation to upper region 33 of cotton compacting chamber 24, above cotton distributing and compacting apparatus 34.

Referring to FIGS. 4 and 5, that portion of structure 52 that comprises forward end 22 of apparatus 12 defines an interior cotton receiving chamber 54 located generally above and downwardly open to a forward end of upper region 33 of cotton compacting chamber 24, and can optionally extend over a more middle region thereof. Structure 52 preferably additionally includes a cotton densification chamber 56 in connection with cotton receiving chamber 54, located rearwardly thereof and generally above and downwardly open to an opposite end and a middle portion of upper region 33 of cotton compacting chamber 24. Structure 52 further preferably defines an inwardly facing inlet opening 58 in connection with an inlet region 60 of cotton receiving chamber 54, disposed for receiving flows A of airborne cotton from side-by-side array of ducts 20 in connection with harvesting units 16. Inlet opening 58 and inlet region 60 of cotton receiving chamber 54 have a predetermined second sideward extent Y, as shown in FIG. 5, which is equal to at least about twice the sideward extent X of upper region 33 of compacting chamber 24. Here, sideward extent Y is illustrated to be from about 11 to 12 feet, which is the maximum permissible width of a vehicle for unescorted travel over public roads in the USA, and sideward extent X is about 4 to 5 feet, although other values for X and Y can be used as desired or required for a particular application. Structure 52 further preferably includes opposing side wall portions 62 defining sides of cotton receiving chamber 54, and which include tapered portions 64 which taper convergingly from inlet region 60 to densification chamber 56, defining a transition region 66 of receiving chamber 54, wherein at least portions of flows of airborne cotton received through inlet opening 58 will be convergingly guided by tapered portions 64 into densification chamber 56, as best shown by arrows A in FIG. 5. Tapered wall portions 64 can be straight, or convex or concave or otherwise curved, as desired or required for a particular application.

Structure 52 includes opposing side walls 68 which define cotton densification chamber 56 and extend from tapered portions 64 to an end wall 70 of structure 52 which encloses and defines the end of cotton densification chamber 56. A roof 72 covers transition region 66 of chamber 54, and all of cotton densification chamber 56. Side wall portions 62 and 64, side walls 68, end wall 70, and roof 72 can be of solid sheet metal or plastic, or have holes or perforations therethrough, as required or desired for a particular application. Inlet region 60 of cotton receiving chamber 54 is preferably covered by a screen 74. That portion of cotton receiving chamber 54 disclosed directly above upper region 33 of cotton compacting chamber 24, and substantially all of cotton densification chamber 56, are downwardly open in connection with region 33, essentially over the entire forward to rearward length thereof. Referring more particularly to FIGS. 4 and 5, it is evident that cotton receiving chamber 54 extends sidewardly beyond side walls 32 of module builder 14, for accommodating the width of array of ducts 20, and the bottoms of those portions of chamber 54 which extend beyond side walls 32 are enclosed by floor panels 76. As a result, it is evident that structure 52 defines an upwardly closed and downwardly open continuous cavity which is significantly wider at inlet opening 58 and inlet region 60, and which tapers down through a transition region to a much narrower densification region of chamber 56 having a sideward extent about equal to sideward extent X of upper region 33 of chamber 24. As a result, flows of cotton A from ducts 20 through inlet opening 58 will pass through inlet region 60 and into transition region 66, wherein portions of the flows will fall onto apparatus 34, and portions will be converged and consolidated so as to pass in a denser state into densification chamber 56. Some of the cotton will fall from cotton receiving chamber 54 into the more forward portion of upper region 33 of compacting chamber 24 and onto cotton distributing and compacting apparatus 34, while some of the cotton will fall from densification chamber 56 into more mid and rear regions of upper region 33 so as to fall on corresponding portions of compacting apparatus 34. During the inflow of cotton, augers 48 can be operated as required for distributing the cotton into compacting chamber 24, and compacting apparatus 34 can be driven downwardly against cotton collected in chamber 24 for compacting it into a compacted module, such as module 44.

Cotton receiving and densification apparatus 12 can include an inlet hood 78 extending forwardly from inlet opening 58 for facilitating smooth transition of flows of cotton A from ducts 20 into inlet opening 58. Hood 78 is removed in FIGS. 4 and 5 for clarity.

Figure 6:
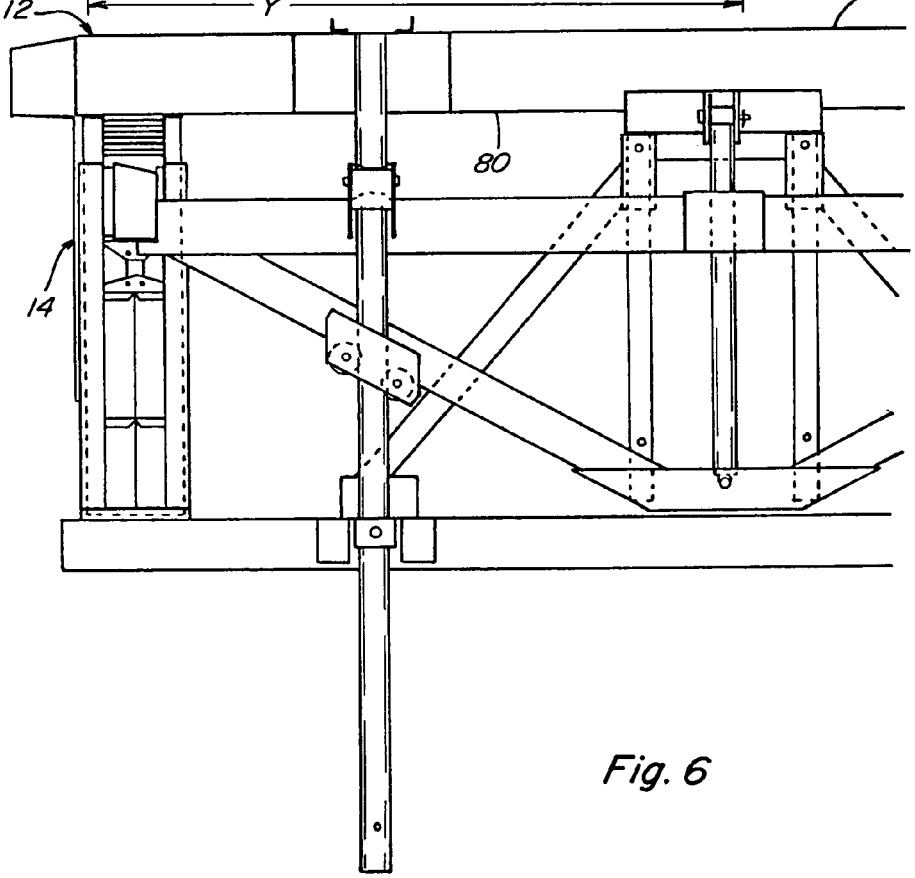
FIG. 6 is another fragmentary side view of the module builder, shown in a telescopically collapsed state, and showing the receiving and densification apparatus.

In FIG. 6, module builder 14 is shown in a vertically retracted or collapsed state, wherein an upper portion thereof on which apparatus 12 is mounted, is telescopically received in a lower portion of the module builder. Here, it can be observed that a lower periphery 80 of structure 52 remains above the lower portion of module builder 14, such that no folding, unfolding, disassembly or other steps in regard to apparatus 12 is required when placing module builder 14 in the retracted state. Such state shown is suitable for travel on public roads, under bridges and the like.

It will be understood that changes in the details, materials, steps, and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

What is claimed is:

1. Cotton receiving and densification apparatus, comprising:

structure disposed in covering relation to an upper region of a cotton compacting chamber of a cotton module builder and a cotton distributing and compacting apparatus therein, the cotton distributing and compacting apparatus supported in the upper region of the compacting chamber for movement downwardly against cotton collected therein, the upper region having a predetermined first sideward extent, the structure defining a cotton receiving chamber generally above and downwardly open to one end of the upper region of the cotton compacting chamber and a cotton densification chamber in connection with the cotton receiving chamber generally above and downwardly open to an opposite end of the cotton compacting chamber, the structure defining an endwardly facing inlet opening in connection with an inlet region of the cotton receiving chamber and disposed for receiving a side-by-side plurality of flows of airborne cotton, the inlet opening and the inlet region of the cotton receiving chamber having a predetermined second sideward extent which is equal to at least twice the first sideward extent of the upper region of the compacting chamber, the structure including side wall portions defining sides of the cotton receiving chamber which taper convergingly from the inlet region to the densification chamber such that at least portions of flows of airborne cotton received through the inlet opening into the inlet region will be convergingly guided by the side wall portions into the densification chamber, wherein the side wall portions of the structure defining the cotton receiving chamber extend sidewardly beyond sides of the module builder, and an upper portion of the module builder on which the structure is located is vertically retractable to a retracted position in relation to a lower portion of the module builder, such that when the upper portion is in the retracted position, the side wall portions of the cotton receiving chamber extend sidewardly beyond sides of the module builder.

2. Cotton receiving and densification apparatus of claim 1, wherein the densification chamber has a sideward extent about equal to the first sideward extent of the upper region of the compacting chamber.

3. Apparatus of claim 1, wherein the cotton distributing and compacting apparatus includes at least one auger operable for conveying cotton disposed thereon toward an end of the compacting chamber below the cotton receiving chamber, and the structure is configured for causing some of the cotton to fall onto the cotton distributing and compacting apparatus below the receiving chamber.

4. Apparatus of claim 1, wherein the cotton distributing and compacting apparatus includes at least one auger operable for conveying cotton disposed thereon toward an end of the compacting chamber below the cotton densification chamber.

5. Apparatus of claim 1, wherein the second sideward extent is equal to about three times the first sideward extent.

6. A cotton module builder for a cotton harvesting machine, comprising:

a floor and opposing side walls extending upwardly from opposite peripheral edges of the floor defining an upwardly open cotton compacting chamber, the compacting chamber including an upper region having a predetermined first sideward extent;

cotton distributing and compacting apparatus supported in the upper region of the compacting chamber for movement downwardly against cotton collected therein for compacting the collected cotton into a compacted cotton module, the cotton distributing and compacting apparatus being configured for supporting cotton thereon and including at least one elongate auger rotatable for moving cotton supported thereon longitudinally therealong and downwardly therethrough for distribution into the compacting chamber; and cotton receiving and densification structure disposed in covering relation to the upper region of the cotton compacting chamber and the cotton distributing and compacting apparatus, the cotton receiving and densification structure defining a cotton receiving chamber generally above and downwardly open to one end of the upper region of the cotton compacting chamber and a cotton densification chamber in connection with the cotton receiving chamber generally above and downwardly open to an opposite end of the cotton compacting chamber, the structure defining an endwardly facing inlet opening in connection with an inlet end of the cotton receiving chamber and disposed for receiving flows of airborne cotton from a side-by-side array of ducts in connection with harvesting apparatus of a harvesting machine, the inlet opening and the inlet end of the cotton receiving chamber having a predetermined second sideward extent which is at least twice the first sideward extent of the upper region of the compacting chamber and a sideward extent of the cotton densification chamber, the structure including side wall portions defining sides of the cotton receiving chamber which taper convergingly from the inlet region to the densification chamber such that at least portions of flows of airborne cotton received through the inlet opening into the inlet region will be convergingly guided by the side wall portions into the densification chamber.

7. The module builder of claim 6, wherein the at least one auger of the cotton distributing and compacting apparatus is rotatable for conveying cotton therealong toward an end of the cotton compacting chamber below the cotton receiving chamber.

8. The module builder of claim 6, wherein the second sideward extent is equal to about 3 times the first sideward extent.

9. The module builder of claim 6, wherein opposing side wall portions of the structure defining the cotton receiving chamber extend sidewardly beyond sides of the cotton module builder.

10. The module builder of claim 6, wherein the module builder comprises an upper portion defining and enclosing an upper region of the cotton compacting chamber and an lower portion defining and enclosing a lower region of the cotton compacting chamber, the upper portion being telescopically receivable within the lower portion and being positionable therein in a telescopically retracted position for decreasing an overall height of the module builder, and a portion of the structure defining sides of the cotton receiving chamber being disposed above the lower portion of the module builder when the upper portion is in the telescopically retracted position.

11. The module builder of claim 6, wherein the predetermined second sideward extent has a value within a range from about 10 to about 12 feet, and the predetermined first sideward extent has a value of from about 3 to about 5 feet.

* * * * *